INVENTOR
RAYMOND S. MILLER
BY
ATTORNEY

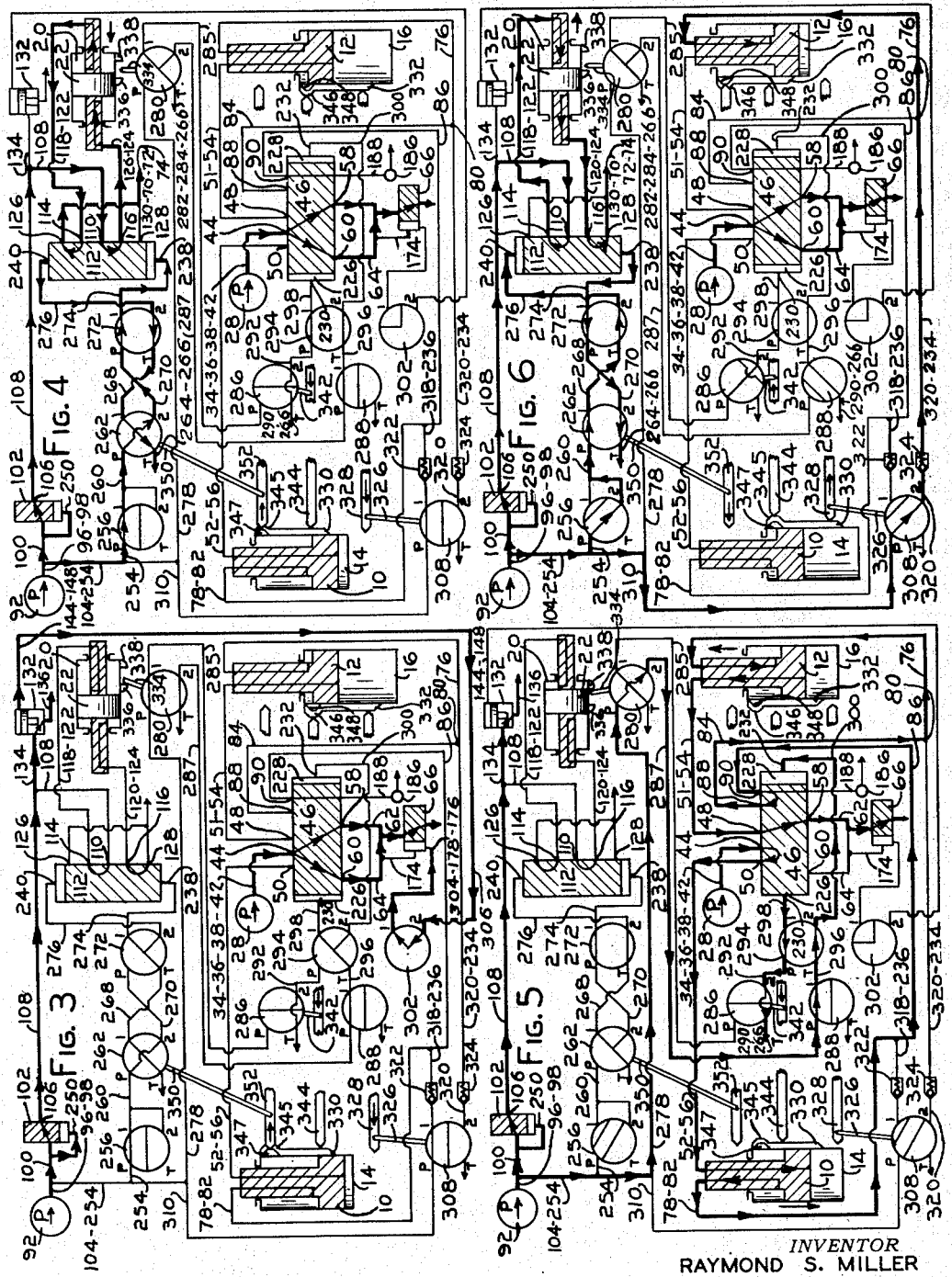

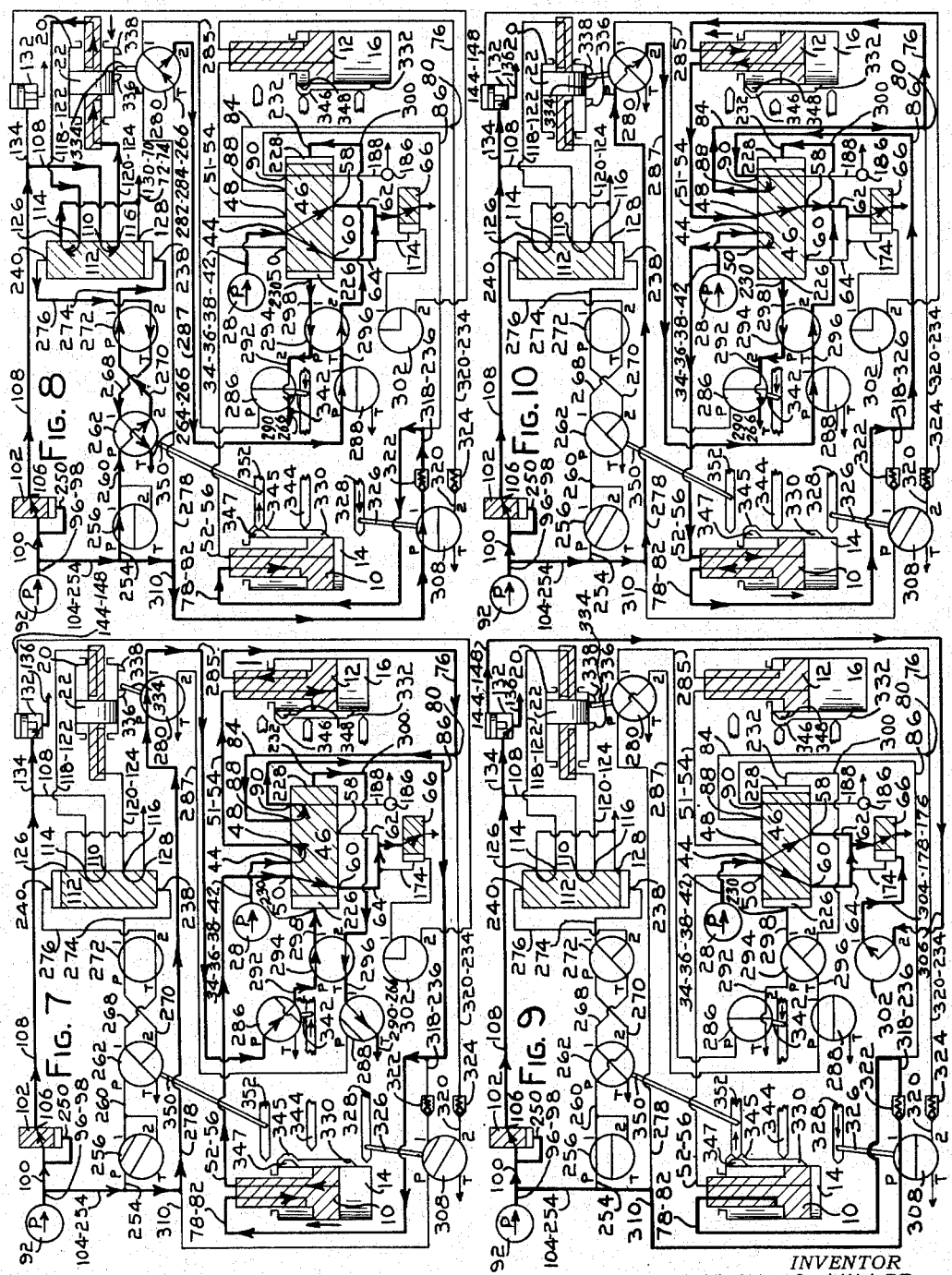

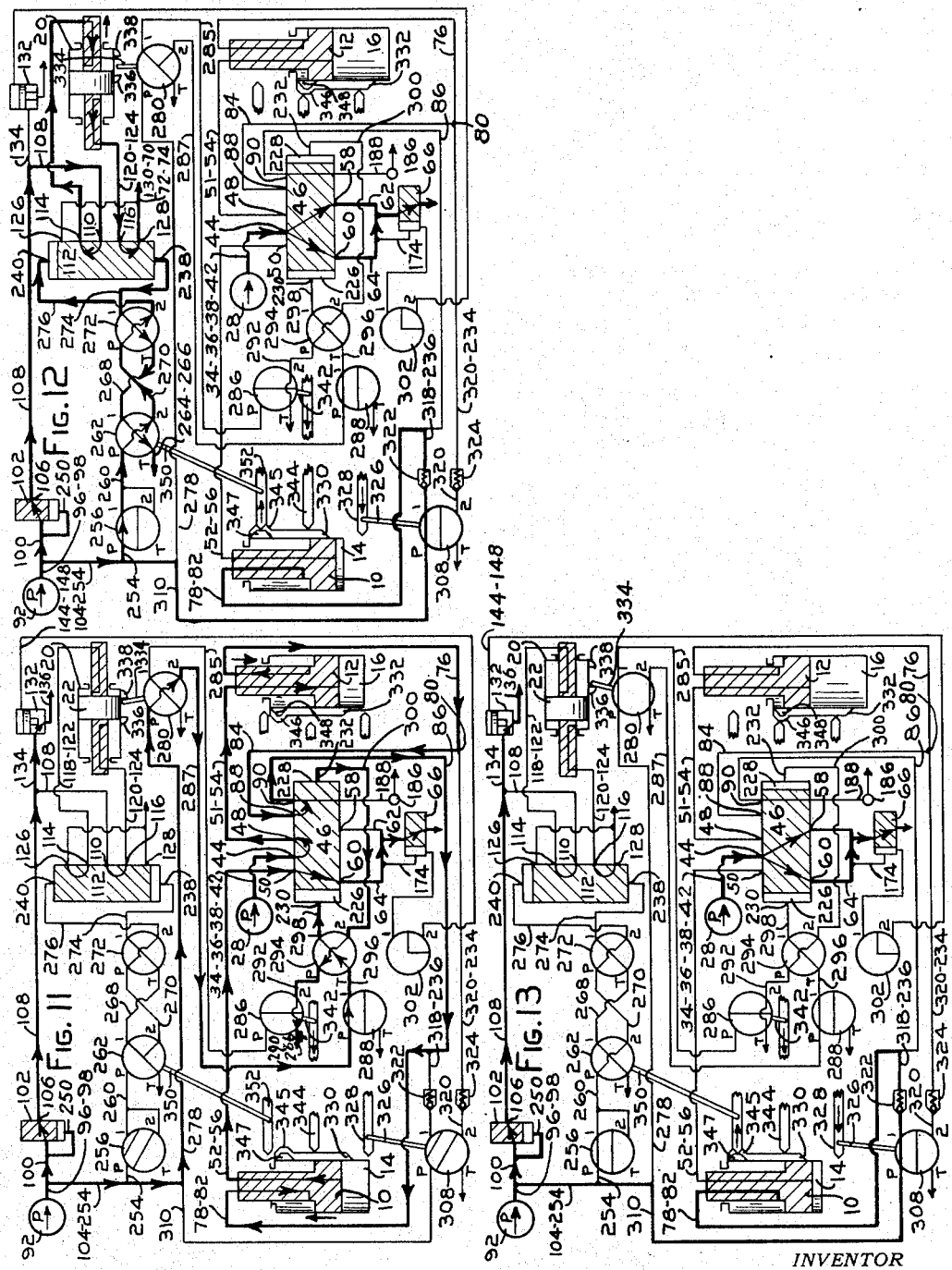

Patented Oct. 13, 1942

2,298,831

UNITED STATES PATENT OFFICE 2,298,831

POWER TRANSMISSION

Raymond S. Miller, Detroit, Mich., assignor to Vickers Incorporated, Detroit, Mich., a corporation of Michigan Application February 23, 1938, Serial No. 191,903

4 Claims. (Cl. 60—52)

This invention relates to power transmissions and more particularly to those of the type comprising one or more pumps and one or more fluid motors together with interconnecting circuits for conveying a power transmitting fluid such as oil therebetween. The power transmission system is disclosed as particularly adapted for operation of a dual ram broaching machine having a reciprocating work handling member although it will be understood that certain aspects of the invention are readily adaptable to other hydraulically operated machines.

It is an object of the invention to provide a power transmission system of the character described wherein a unitary control panel is utilized for controlling the flow of fluid to the various motors in proper sequence and which incorporates a plurality of servo-operated valves which are under the control of pilot valves operated by the motors themselves whereby the operation of the motors in proper sequence is caused to take place automatically.

A further object is to provide in a system of this character, manual control means for starting and stopping the continuous operation of the system together with manual means for causing reversal of the system at any point in a cycle of operation, and wherein the stopping of the machine in an emergency may be made instantaneous.

A further object is to provide a system of the aforesaid character which incorporates means for causing a reversal of the system after the start of any particular cycle of operation and which is effective to return the parts to their starting position and then to automatically stop.

It is also an object to provide a system of the type described wherein a plurality of pumps are provided, one of which operates the main rams and the other of which supplies fluid for operation of the pilot control system as well as the work handling fluid motor.

Another object is to provide a power transmission system having a pair of reciprocating fluid motors which are hydraulically interconnected for simultaneous operation in opposite directions wherein means is provided for keeping the motors in step and also for adjusting automatically the quantity of fluid in the secondary system to compensate for changes made in the operating stroke of the motor.

A further object is to provide a novel control panel particularly adapted for controlling a hydraulic system of the character described.

Further objects and advantages of the present invention will be apparent from the following description, reference being had to the accompanying drawings wherein a preferred form of the present invention is clearly shown.

In the drawings:

Figures 3 through 13 are diagrams of the hydraulic circuit of Figures 1 and 2 showing the fluid flow paths during various stages of a complete operation cycle.

Figure 1:
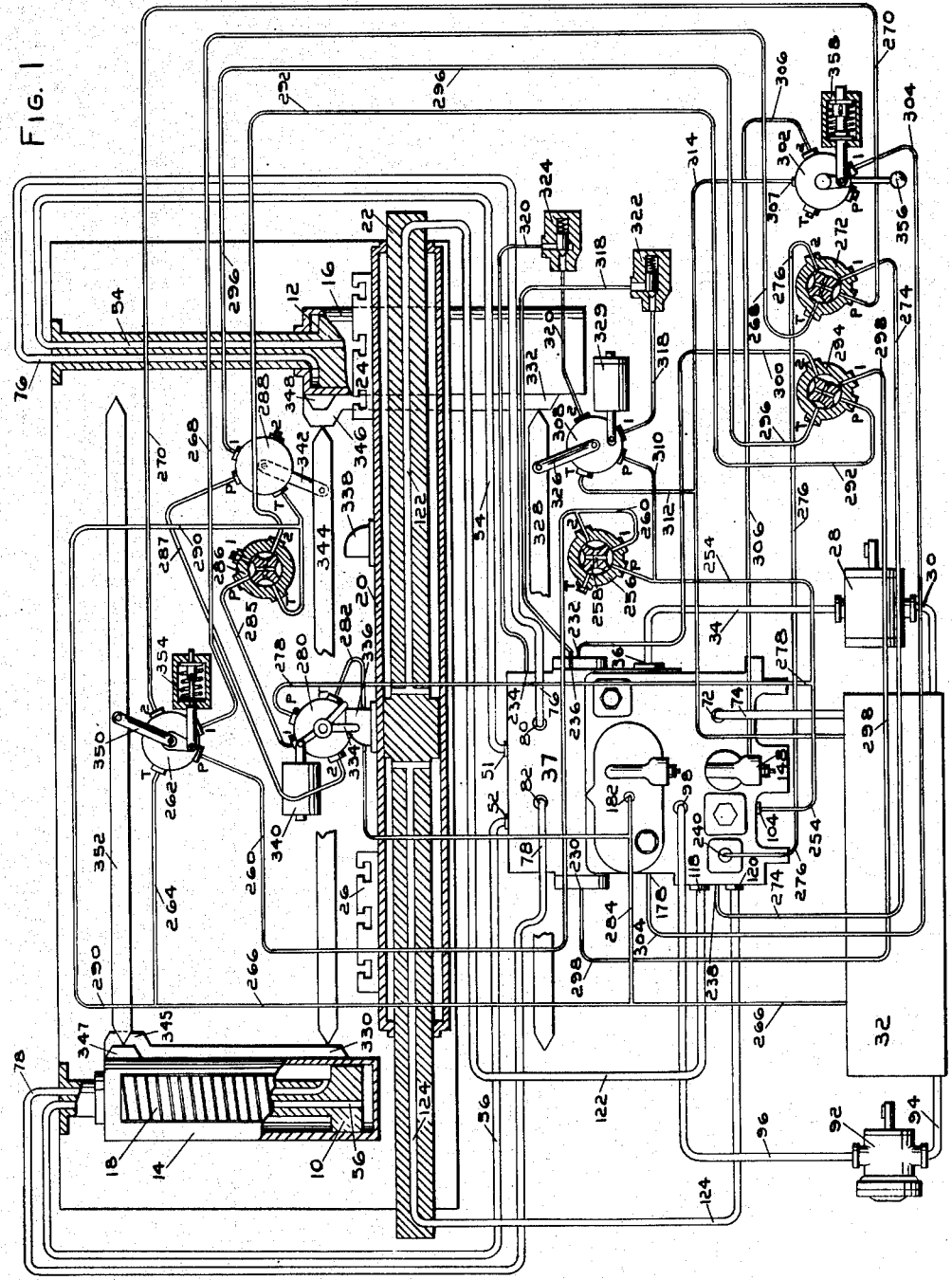
Fig. 1 is a diagrammatic view of a power transmission circuit incorporating a preferred form of the present invention.

The circuit of Fig. 1 illustrates diagrammatically a hydraulic power transmission system particularly adapted for operating a dual ram broaching machine. For this purpose there are provided a pair of reciprocating fluid motors comprising the fixed pistons 10 and 12 carrying the moving cylinders 14 and 16. In the appended claims either of these motors is referred to as a main motor. The cylinders carry broaching tools, one of which is indicated at 18 and which may be so constructed as to broach a flat or shaped surface. Suitable work handling means is provided comprising a reciprocating cylinder 20 slidably mounted on a fixed piston 22. In the appended claims the cylinder 20 and piston 22 are referred to as an auxiliary motor. The cylinder 20 carries work holding means indicated at 24 and 26 and is adapted to be moved to the right or left, to position the work holding means 24 or the work holding means 26 in alignment with the broaching cylinders 16 and 14 respectively. The detailed construction of the broaching machine itself apart from the hydraulic mechanism forms no part of the present invention and is not illustrated, there being many examples of dual ram broaching machines well known in the art and which are suitable applications for the present invention.

Figure 2:
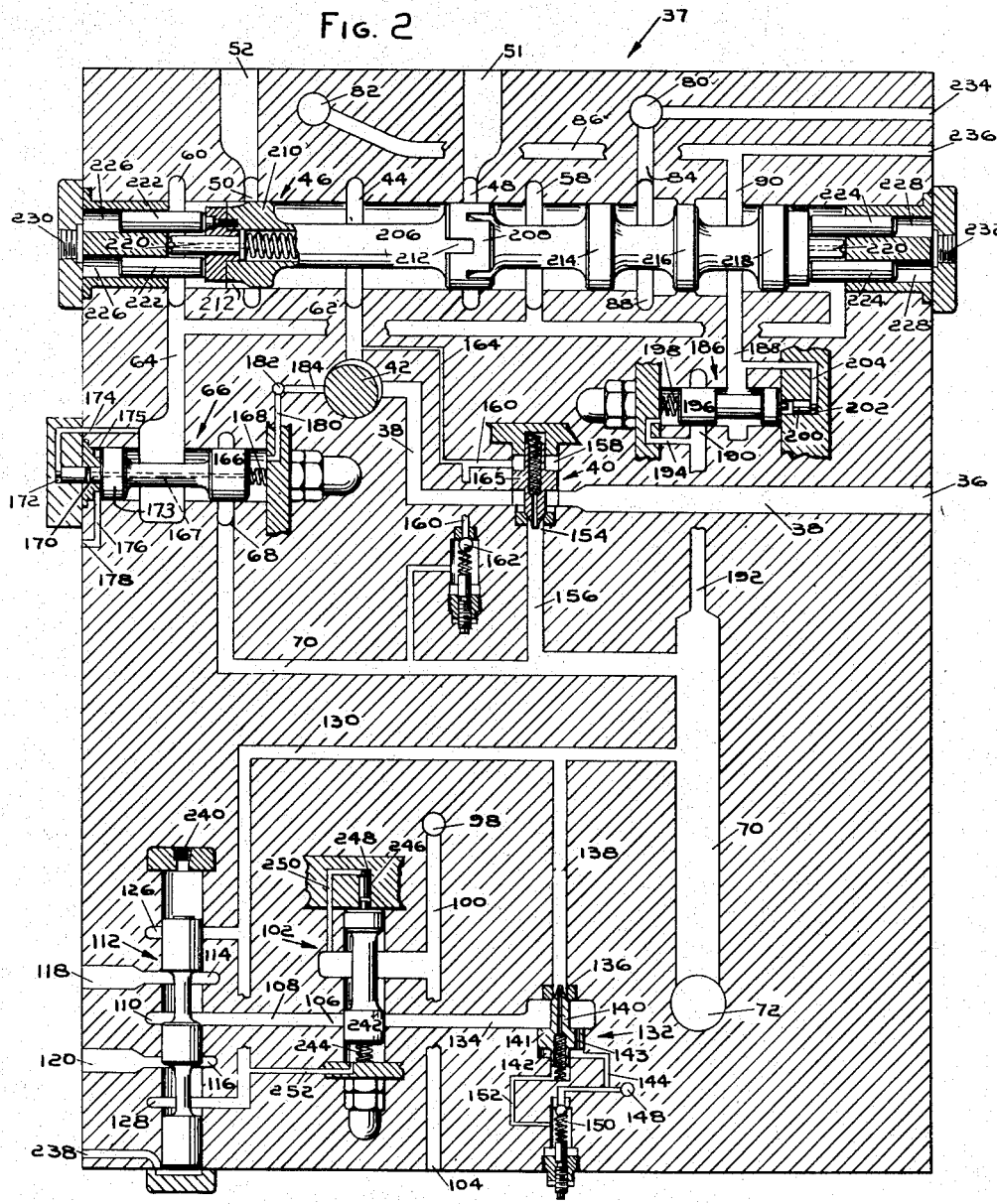
Fig. 2 is a diagrammatic sectional view of a control panel incorporated in the circuit of Fig. 1.

A main pump 28, driven by a suitable prime mover, not shown, provides fluid to operate the cylinders 14 and 16 and has an intake conduit 30 connected with a tank 32 and a discharge conduit 34 connected at 36 to a control panel 37. Referring to Fig. 2, port 36 connects with a pressure conduit 38 extending through a combined flow control and relief valve 40 and a manually operable flow regulating throttle 42 to a pressure port 44 formed in a pilot-operated main control valve 46 for the purpose of controlling the main motors 14 and 16. The latter has a pair of cylinder ports 48 and 50 which extend to connections 51 and 52. The latter are connected by conduits 54 and 56 with the head ends of the cylinders 16 and 14 respectively. Valve 46 has return ports 58 and 60 which communicate by conduits 62 and 64 with a back pressure valve 66, the outlet port 68 of which is connected by a conduit 70 with a tank connection 72. The latter is connected by a pipe 74 with the tank 32. The rod ends of the cylinders 16 and 14 are connected together in a secondary circuit by conduits 76 and 78 to connections 80 and 82 in the panel 37, the latter communicating through conduits 84 and 86 with ports 88 and 90 formed in the valve 46.

A pump 92 driven by a suitable prime mover, not shown, is provided for supplying fluid to the cylinder 20 as well as to the pilot circuits and the secondary circuit. The pump 92 withdraws fluid from the tank 32 through a suction conduit 94 and delivers the same through a delivery conduit 96. The latter extends to a connection 98 of panel 37 which communicates by a conduit 100 with a back-pressure valve 102 and with a pilot pressure connection 104. The back-pressure valve 102 has a discharge port 106 communicating by a conduit 108 with a port 110 of a pilot operated four-way valve 112 for controlling the auxiliary motor 20. The latter has cylinder ports 114 and 116 communicating with connections 118 and 120 which are connected by conduits 122 and 124 with the right and left ends respectively of the cylinder 20. The valve 112 also has tank ports 126 and 128 communicating by a conduit 130 with the tank conduit 10.

The panel 37 also incorporates a relief valve 132 connected by conduit 134 with the port 106 of by-pass valve 102. The relief valve 132 may be of any suitable construction and is illustrated as of the pilot operated type similar to that shown in the patent of Harry F. Vickers 2,043,453. Briefly, the valve 132 has a discharge port 136 connected by a conduit 138 to the tank conduit 130 and normally closed by a valve member 140, having a piston 141 through which a small passage 143 extends. A control chamber 142 is provided which may be vented through a conduit 144 and connection 148 or through a pilot relief valve 150 connected to tank conduit 130 through a conduit 152 and through a central bore in the valve member 140.

The combined flow controlling and relief valve 40 has a port 154 connected to tank through a conduit 156. The control chamber 158 is connected by a comparative open passinge 160 with a pilot relief valve 162 and by a comparative restricted passage 164 with a conduit 38 between the restrictor 42 and the valve 46. The piston 165 of valve 40 is imperforate except for the central drain hole.

The back-pressure valve 66 is provided with a spool 166 having a central bore 167 and normally urged by a spring 168 into a position closing the port 68. At the opposite end the spool 166 is provided with a piston 170 working in a cylinder 172 communicating with the conduit 64 by a passage 174. The annular space 175 at the left hand end of the spool 166 is in communication through a passage 176 with a connection 178. The space at the right hand end of the spool 166 is drained through a passage 180 leading to a drain connection 182. A passage 184 also drains leakage from the restrictor 42 to the connection 182. The panel 37 is provided with a second back pressure valve 186 similar in construction to the valve 66. A conduit 188 connects the valve 186 to the port 90 of valve 46 while the discharge port 190 communicates with the tank connection 72 through a conduit 192. The left hand end of the valve is drained through a passage 194 while the spool 196 is under the joint influence of a spring 198 and a piston 200 operating in cylinder 202 which communicates by a passage 204 with the conduit 188.

The valve 46 is provided with a spool 206 having a pair of heads 208 and 210 slotted as indicated at 212 and, in central position, lying opposite the cylinder ports 48 and 50. This portion of the valve 46 thus operates as a conventional, open center, four-way valve for reversing connection between the conduits 38 and 64 on the one hand and 51 and 52 on the other hand. At its right hand end the spool 206 is provided with three piston heads 214, 216 and 218, controlling communication between the ports 88 and 90. In the central position such communication is blocked. When the spool is moved either to the right or to the left, the port 88 is connected to the port 90. Spring biased plungers 220 normally retain the valve spool in the central position illustrated.

The valve spool 206 may be shifted through the medium of servo pistons 222 and 224, at the left and right hand ends, which operate in bores 226 and 228 communicating with connections 230 and 232 respectively.

The panel 37 also contains auxiliary connections 234 and 236 communicating with the conduits 84 and 86 respectively. The valve 112 is provided with external connections 238 and 240 communicating with opposite ends of the valve bore whereby the latter may be shifted between its opposite extreme positions for supplying fluid to one cylinder connection or the other. The back-pressure valve 102 is similar in construction to the back-pressure valves 66 and 186 and comprises a spool 242, normally closing the discharge port 106. A spring 244 and a piston 246 control the position of the spool, the piston operating in a cylinder 248 communicating by a passage 250 with the conduit 100. The lower end of the valve is drained through a connection 252 leading to the conduit 130. It will be understood that the showing of the panel 37 in Fig. 2 is purely diagrammatic for the sake of clearer illustration and that in commercial practice the positions of the parts are shifted into a more compact arrangement.

For the purpose of controlling the operation of the valves 46 and 112 certain pilot circuits are provided which include a number of similar pilot valves operated by movement of the cylinders 14, 16 and 20 as well as certain manually operated pilot valves. Pressure fluid for the pilot circuits is taken from pump 92 at the panel connection 104 to which a conduit 254 is connected. The conduit 254 connects to port P of a rotary four-way pilot valve 256. The latter has three other ports, T, 1 and 2 disposed circumferentially around the valve body in multiples of 45°. Communication of ports P and T is reversed by means of an oscillatable valve member 258. With the member 258 in the position illustrated in Figure 1, port P is connected to port 1 by the arcuate recess in member 258 which spans these ports while port T is connected to port 2 through one of the transverse bores in member 258.

The construction of all of the pilot valves, later to be described, is similar to that of valve 256, it being understood that this construction is but one example of the many forms of four-way pilot valves suitable for use in these locations. The port T of valve 256 is plugged while the ports 1 and 2 are connected by a conduit 260 with the port P of a pilot valve 262. Valve 262 is similar to valve 256 except that it is of the "open center" type in which the ports 1 and 2 are connected together and to tank when the valve is in center position. Port T of valve 262 is connected by a conduit 264 to a drain conduit 266. Ports 1 and 2 connect by conduits 268 and 270 with ports T and P respectively of a pilot valve 272 which also is of the "open center" type. Port 1 of valve 272 connects by a conduit 274 with the connection 238 of panel 37, while port 2 connects by a conduit 276 with the connection 240. There is thus provided a pilot circuit for operating the valve 112.

The pilot pressure conduit 254 has a branch 278 extending to port P of a pilot valve 280 of the "open center" type. Port T of valve 280 is connected to tank 32 through a conduit 282 leading to a conduit 284 which is connected between the drain connection 182 of the panel 37 and the tank conduit 266. Port 1 of valve 280 is connected by a conduit 285 to port P of a pilot valve 286. Port 2 of pilot valve 280 is connected by a conduit 287, to port P of a pilot valve 288. Port 1 of valve 286 and port 2 of valve 288 are plugged. Ports T of both valves connect to tank by a conduit 290, leading to the conduit 266. Port 2 of valve 286 is connected by a conduit 292 to port P of a valve 294 of the "open center" type. Port 1 of valve 288 is connected by a conduit 296 to port T of valve 294. Port 1 of valve 294 connects by a conduit 298 to the connection 230 while port 2 connects by a conduit 300 to the connection 232 of the panel. There is thus provided a pilot circuit for controlling the valve 46 of the panel.

For the purpose of controlling venting of relief valve 132 and for also opening the back-pressure valve 66, a pilot valve 302 of the "open center" type is provided, having its ports P and T plugged. Port 1 of valve 302 is connected by a conduit 304 with the connection 178 of the panel while port 2 is connected by a conduit 306 with the connection 148 of the panel. The valve 302 differs from the previous pilot valves in that it is provided with an external drain connection 307.

For the purpose of providing makeup fluid for the secondary circuit connecting the rod ends of the cylinders 14 and 16, a pilot valve 308 is provided, port P of which is connected by a conduit 310 with the pilot pressure conduit 254. Port T of valve 308 connects by a conduit 312 with a conduit 314 leading from the drain connection 307 of the valve 302 to the tank 32. Port 1 of valve 308 is connected by a conduit 318 with the connection 236 of the panel while port 2 is connected by a conduit 320 with the connection 234 of the panel. Check valves 322 and 324 are interposed in the conduits 318 and 320.

Certain of the pilot valves are arranged in several banks for simultaneous operation. For this purpose they are assembled in coaxial relationship and their rotary elements are connected to a common operating shaft. The valves 256 and 308 are operated by a common lever 326 actuated by a shiftable link 328. The latter is adapted to be actuated to the left or right by cams 330 and 332 mounted on the cylinders 14 and 16, for longitudinal adjustment thereon. The lever 326 is spring biased to center position by a centering mechanism 329 and remains in center position until positively moved to one of its other positions by one of the cams 330 or 332. Valve 280 has a forked operating lever 334 adapted to be actuated by adjustably mounted trips 336 and 338 carried by cylinder 20. Spring centering means 340 is provided for permitting the valve to spring center when lever 334 is not contacted by either trip 336 or 338. The two fork arms of the lever 334 are in different planes, parallel to the plane of the drawings, as are the trips 336 and 338 whereby each trip will engage only one leg of lever. Valves 286 and 288 are connected together for operation by a lever 342 which is not spring centered. The latter is operated by a shiftable link 344 actuated by cams 345 and 346 integral with the cams 330 and 332 and longitudinally adjustable therewith. Valve 262 is operated by a lever 350 connected to a link 352 which is actuated by fixed cams 347 and 348. The link 352 and cams 347 and 348 are in a plane slightly forward of the plane of the other cams. Spring centering means 354 is provided for the valve 262. Valves 294, 272 and 302 are connected together for common operation by a manual control lever 356. The latter is provided with spring centering means 358 which is effective to move the lever to center position only from the left hand position and not from the right hand position.

In operation the pumps 28 and 92 withdraw oil from the tank 32 delivering the same through conduits 34 and 96 to the connections 36 and 98 of the panel 37. With the parts in the position shown in Figures 1 and 3 the delivery of pump 92 is by-passed through relief valve 132 and the delivery of pump 28 is by-passed freely through valves 46 and 66 in the following manner (Figure 3):

Since the manually operated pilot valve 302 is in center position, ports 1 and 2 are connected, thus forming a circuit from the control chamber 142 of relief valve 132 through conduit 144, connection 148, conduit 306, valve 302, conduit 304, connection 178 and passage 176 to the annular chamber 175 of valve 66. The delivery of pump 92 flows from the connection 98 through conduit 100 until sufficient pressure is built up to open valve 102, this pressure acting on piston 246 through conduit 250 and overcoming the force of the spring 244. The oil then flows from port 106 through conduit 134 and pressure is exerted on the upper face of the piston 141 of the valve member 140. Since the control chamber 142 is connected to the annular space 175 in the valve 66 by a relatively unrestricted conduit as compared to the small bore 143 connecting the opposite sides of the piston of valve 140, it will be seen that the valve member 140 will move downwardly and spool 166 will move to the right until the central bore 167 opens to the annular space 175. With spool 166 in its right hand position, chamber 142 is vented and relief valve 132, accordingly, stays open permitting the delivery of pump 92 to discharge through port 136 and conduit 138 to the tank connection 72. The throttling occurring at valve 102 is negligible since, as will be seen later, this valve is set to open at a relatively low pressure. The delivery of pump 28 flows from the connection 36 through conduits 38 and restrictor 42 to port 44 and thence flows equally to the left and right through the slots 212, ports 58 and 60, conduits 62 and 64, valve 66 and conduits 68 and 70 to the tank connection 72.

When it is desired to start operation of the machine through repeated cycles in sequence the handle 356 is moved counter clockwise in Fig. 1, (Figure 4), simultaneously rotating valves 302, 294 and 272 thereby blocking the ports 1 and 2 of valve 302 and connecting port T to port 2 and port P to port 1 in each of the valves 294 and 272. Due to the closure of ports 1 and 2 in valve 302 the venting path described in the preceding paragraph is closed and accordingly relief valve 132 closes under the action of its spring. Since flow no longer occurs from control chamber 142 into the annular space 175, the valve 66 tends to close as the oil in space 175 leaks out port piston 173, but, as soon as the spool 166 begins to restrict port 68, pressure will build up in conduit 64 and react through conduit 174 on piston 172 to prevent further closure of valve 66. The valve accordingly acts from this point on as a back pressure or resistance valve in the line 64—68—70. With the pilot valves 256, 308, 280, 286, 288 and 262 in the position shown in Fig. 4, the pilot circuit which controls valve 46 is connected to tank on both sides. The cylinders 226 are connected to tank through connection 230, conduit 298, ports 1 and P of valve 294, conduit 292, ports 2 and T of valve 286 and conduits 290 and 266 to the tank. The cylinders 228 are connected to tank through connection 232, conduit 300, ports 2 and T of valve 294, conduit 296, ports 1 and P of valve 288, conduit 287, ports 2 and T of valve 280 and conduits 282, 284 and 266 to the tank. The valve spool 206 of valve 46, accordingly, remains spring centered.

The turning of handle 356, however, completes a pilot circuit to move valve 112 into its upward position. This circuit is from the pump 92 through conduit 96, connection 98, conduit 100, connection 104, (from which connection all pressure oil for operating the pilot circuits is taken) through conduit 254, ports P and 1 of valve 256, conduit 260, ports P and 2 of valve 262, conduit 270, ports P and 1 of valve 272, conduit 274 and connection 238 to the lower end of the valve 112. Oil returns from the top end of valve 112 through connection 240, conduit 276, ports 2 and T of valve 272, conduit 268, ports 1 and T of valve 262, and conduits 264 and 266 to tank. With the valve 112 in its upward position, oil from the pump 92 escaping from the port 106 of the back-pressure valve 102 passes through conduit 108, ports 110 and 116, connection 120 and conduit 124 to the left end of cylinder 20. The latter, accordingly, moves to the left, fluid being displaced from the right side of piston 22 through conduit 122, connection 118, ports 114 and 126, conduits 130 and 70, connection 72 to exhaust conduit 74, shifting the work holder 26 into alignment with the tool 18 of the cylinder 14. At the same time the work holder 24 is withdrawn from its position opposite the cylinder 16 so that the finished work thereon may be removed and a new work piece secured thereto. The back-pressure valve 102 is adjusted so that the pressure in conduit 100 is always sufficiently high to operate the pilot circuits which, however, do not require but a fraction of the pressure required to operate motor 20. It will be noted that during the initial movement of the cylinder 20, the trip 336 releases the forked arm 334, permitting the valve 280 to spring center, thus connecting both ports 1 and 2 in the valve 280 to tank port T. As the cylinder 20 reaches the end of its movement, trip 338 contacts the forked arm 334, shifting the valve 280 clockwise to connect port P with port 2 and port T with port 1 (Figure 5). Pilot pressure is accordingly permitted to pass from the connection 104 through conduits 254 and 278, ports P and 2 of valve 280, conduit 287, ports P and 1 of valve 288, conduit 296, ports T and 2 of valve 294, conduit 300 to the connection 232 and chambers 228. The valve spool 206 of valve 46 is accordingly moved to the left connecting ports 44 and 50 together and connecting ports 48 and 58 together. Oil returns from the chambers 226 through connection 230, conduit 298, ports 1 and P of valve 294, conduit 292, ports 2 and T of valve 286 and conduits 290 and 266 to tank. Pressure fluid from the pump 28 is accordingly permitted to pass through conduit 34, connection 36, conduit 38, restrictor 42, ports 44 and 50, connection 52 and conduit 56 to the head end of cylinder 14, causing the latter to move downwardly. Fluid discharged from the rod end of cylinder 14 passes through the secondary circuit comprising the conduit 78, connection 82, conduit 86, port 90, port 88, conduit 84, connection 80, and conduit 76 to the rod end of cylinder 16. The latter moves upwardly in synchronism with the downward movement of cylinder 14. The fluid discharged from the head end of cylinder 16 passes through conduit 54, connection 51, ports 48 and 58, conduits 62 and 64 to the valve 66. This valve maintains a predetermined back pressure against such flow as previously described.

As soon as cylinder 14 starts to descend, cam 347 releases rod 352 and valve 262 will be centered; also as cylinder 16 moves upwardly, cam 332 releases rod 328 permitting centering means 329 to center valve 308 and with it valve 256.

At the end of the lefthand movement of cylinder 20, and valve 280 turned to connect P to 2, flow occurs through 278, ports P and 2 (of valve 280), conduit 287, ports P and 1 of valve 288, conduit 296, ports T and 2 of valve 294, and conduit 300 to connection 232 to shift valve 46 to the left to cause discharge from pump 28 through 38, ports 44 and 50, lines 52 and 56 to start cylinder 14 downwardly. Fluid from the top of cylinder 14 flows through 78, 82, 86, 236 into 86, ports 90 and 88 to 84, 80, and 76 to the upper end of cylinder 16. At this time pump 92 is also connected to line 86 through 96, 98, 104, 254, 310, ports P and 1 of valve 308, line 318, check valve 322, line 318, connection 236 and line 86 to 90 so that, because of the fact that the displacements at the top of cylinders 14 and 16 are equal, cylinder 16 will move upwardly faster than 14 moves downwardly during the first portion of the movement, until cam 332 releases 328 to thereby permit 329 to center valve 308 to disconnect ports P and 1 thereof. If the total secondary circuit leakage should be less than the quantity thus admitted through check valve 322, cylinder 16 will reach the top of its stroke before 14 reaches the bottom of its stroke and valve 262 will hence be operated before valve 288 operates. The extra fluid over the relative volumes in the two cylinders, still contained in the upper end of cylinder 14 after 16 reaches the top of its stroke, is displaced out through 90, 188, 190, 192, 70, 72 and 74, by valve 186 opening by pressure built up in 188, 204.

As soon as cylinder 14 reaches the bottom of its stroke, cam 345 engages link 344, shifting the valves 286 and 288 clockwise. This results in connecting both actuating chambers of the valve 46 to tank, permitting the same to spring center as follows (Figure 6):

Chambers 226 are connected to tank through connection 230, conduit 298, ports 1 and P of valve 294, conduit 292, ports 2 and P of valve 286, conduit 285 and ports 1 and T of valve 280, conduits 282, 284 and 266 to the tank. Chambers 228 are connected to tank through connection 232, conduit 300, ports 2 and T of valve 294, conduit 296, ports 1 and T of valve 288 and conduits 290 and 266 to the tank. The pump 28 is accordingly by-passed through the slots 212, the oil returning to the tank through the by-pass valve 66 which creates a slight back pressure on the oil in the head ends of both cylinders.

As the cylinder 14 reaches the bottom of each stroke, cam 330 also shifts link 328, moving valves 256 and 308 clockwise from their spring-centered position to which they moved when cylinder 16 started up, for the purpose of making up any fluid lost by leakage in the secondary circuit beyond that replaced through check valve 322 at the beginning of the stroke. Should the leakage be that great the cylinder 16 will not reach the top of its stroke when cylinder 14 reaches the bottom of its stroke. Accordingly, (Figure 6) fluid from the pump 92 is delivered from port 104 through conduits 254 and 310, ports P and 2 of valve 308, conduit 320, check valve 324, and connection 234 to the connection 80 which communicates with the rod end of cylinder 16 through conduit 76. It will be noted that valve 46 has spring centered at about the same time, cutting off port 90 from port 88 and thus admitting the makeup fluid only to cylinder 16. The latter moves upwardly, the pressure from pump 92 being able to overcome the resisting pressure exerted in the head end of cylinder 16 by the back pressure valve 66. The pilot relief valve 150 of valve 132 is set to operate at a much higher pressure than valve 66 for this purpose.

As soon as cylinder 16 completes its upward stroke, cam 348 engages link 352, shifting valve 262 counter clockwise from its spring centered position to which it moved as the cylinder 14 started down. By the shifting of this link and of the link 328 a new pilot circuit is established to shift the valve 112 downwardly as follows (Figure 6):

Pilot pressure flows from the connection 104 through conduit 254, ports P and 2 of valve 256, conduit 260, ports P and 1 of valve 262, conduit 268, ports T and 2 of valve 272 and conduit 276 to the connection 240 thus moving the valve 112 downward, as shown in Fig. 6, and connecting the port 114 to the pressure port 110. Oil returns from the lower end of valve 112 through connection 238, conduit 274, ports 1 and P of valve 272, conduit 270, ports 2 and T of valve 262, and conduits 264 and 266 to tank. Fluid from the pump 92 is accordingly delivered from port 106 of by-pass valve 102 through conduit 108, ports 110 and 114, connection 118 and conduit 122 to the right hand end of cylinder 20, moving the same to the right to position the work holder 24 in line with cylinder 16 and removing the work holder 26 out of line with the cylinder 14. As soon as cylinder 20 moves to the right a short distance, cam 338 releases trip 334 which results in spring centering means 340, centering valve 280 to connect its ports 1 and 2 to port T thereof. The work broached in the holder 26 may be removed and a new work piece inserted. As the cylinder 20 reaches the end of its rightward stroke, trip 336 engages lever 334 to move valve 280 counterclockwise Figure 1 (clockwise Figure 7). A pilot circuit is thus established for shifting the valve 46 to the right as follows (Figure 7):

Pilot pressure is admitted from connection 104 through conduits 254 and 278, ports P and 1 of valve 280, conduit 285, ports P and 2 of valve 286, conduit 292, ports P and 1 of valve 294, conduit 298, and connection 230 to the cylinders 226. Oil returns from chambers 228 thru connection 232, conduit 300, ports 2 and T of valve 294, conduit 296, ports 1 and T of valve 288, and conduits 290 and 266 to tank. With the valve 46 shifted to the right, pressure fluid from the pump 28 is admitted to port 48 and connection 51 where it flows through conduit 54 to the head end of cylinder 16. Cylinder 16 moves downwardly and cylinder 14 moves upwardly in a manner exactly analogous to the opposite movement previously described. As cylinder 16 reaches the end of its downward stroke, cams 346 and 332 shift the links 344 and 328 to the left, returning valves 286, 288 and 256 and 308 to the position shown in Fig. 1 (Figure 8). Pilot pressure is accordingly permitted to flow from connection 104 through conduits 254 and 310, ports P and 1 of valve 308, conduit 318, check valve 322 and connection 236, to conduit 86 which is in communication with the rod end of cylinder 14. Makeup oil is thus supplied to the latter, causing the same to complete its stroke if it has not already done so and holding it up thereafter. At the same time shifting of valves 286 and 288 permits the valve 46 to spring center as follows (Figure 8):

Chambers 226 are connected to tank through connection 230, conduit 298, ports 1 and P of valve 294, conduit 292, ports 2 and T of valve 286 and conduits 290 and 266 to the tank. Chambers 228 are connected to tank through connection 232, conduits 300, ports 2 and T of valve 294, conduit 296, ports 1 and P of valve 288, conduit 287, ports 2 and T of valve 280, and conduits 282, 284, and 266 to the tank.

As cylinder 14 completes its upward movement, cam 347 shifts link 352 and valve 262 is shifted from its spring centered position to the clockwise Figure 1 (counterclockwise Figure 8) position as shown, thus initiating a new cycle of operation identical to that described. When it is desired to stop the machine handle 356 is moved to center position (Figure 9), thus venting the pilot circuits of valves 112 and 46 and opening the vent circuit for relief valve 132 as previously described. If at any point in the cycle it becomes necessary to reverse the operation of the cylinders 14 and 16 and 20, the handle 356 may be moved clockwise from the position shown and no matter what the pilot connections may be at the time of reversal, the valve 294 reverses connections for the valve 46 and the valve 272 reverses connections for the valve 112. Under these conditions the machine operates reversely to return the cylinders 14 and 16 to their starting point and to return the cylinder 20 and then stop automatically. This is an emergency control which, when operated at any point in a cycle, causes the machine to reverse only to the point at which the particular cycle started. For illustration let it be assumed that a broaching cycle of the cylinder 14 has been started and that the work cylinder has shifted to the left at the start of the cycle and thereafter the cylinder 14 has started to move down and cylinder 16 to move up (Figure 10 which is the same as Figure 5). As soon as handle 356 is moved further clockwise from its initial setting (Figure 11), to the left the pilot circuits to valves 46 and 112 are reversed at valves 294 and 272 respectively, while the valve 302 still blocks communication between ports 1 and 2. The pilot circuit for valve 112 is incomplete, however, since when as cylinder 16 started up, valve 256 spring centered, thus blocking ports 1 and 2 thereof. The pilot circuit for valve 46 is complete and pressure oil flows from connection 104 through conduits 254 and 278, ports P and 2 of valve 280, conduit 287, ports P and 1 of valve 288 (this valve is not spring centered and so remains shifted clockwise after cylinder 16 starts upwardly), conduit 296, ports T and 1 of valve 294, conduit 298 and connection 230 to chambers 226. Valve 46 accordingly shifts to the right causing cylinder 14 to back up and cylinder 16 to back down. As soon as cylinder 14 gets to the top and cylinder 16 gets to the bottom, the cylinders stall and relief valve 40 opens. Also as seen in Figure 12, the pilot circuit for valve 112 is completed and pressure oil flows from connection 104, through conduit 254, ports P and 1 of valve 256, conduit 260, ports P and 2 of valve 262, conduit 270, ports P and 2 of valve 272, conduit 276 and connection 240 to the top of valve 112. The latter moves down to cause the cylinder 20 to move to the right withdrawing the partly finished work piece from out of line with cylinder 14. As cylinder 20 completes its movement to the right, the valve 280 is shifted counterclockwise Figure 1 (clockwise Figures 12 and 13), opening the left end of valve 46 to tank and permitting valve 46 to spring center, thus unloading pump 28 as shown in Figure 13, but a new cycle of the cylinders 14 and 16 does not take place. Pressure oil entering the valve 280 at port P, passes through port 1, conduit 285, and ports P and 1 of valve 286. The latter port is blocked so that the machine accordingly stops until the handle 356 is again moved to the "start" position at the right. The machine may also be stopped manually during a reverse cycle by merely releasing the handle 356 which returns to center and vents the relief valve 132 as well as connects both sides of valves 112 and 46 together and to tank, permitting valve 46 to center and thus stop the main rams. The reversal of the machine may also be made after cylinder 20 has started, but before the cylinders 14 and 16 have started. In this case the operation is the same as described above after cylinders 14 and 16 have returned to the starting position. The operation for reversal during other parts of the cycle will be obvious from the description already given.

The valve 186 operates as an overflow valve for the secondary circuit and normally remains closed at all times during the cycle. If the position of the cams 330—345 and 332—346 carried by the cylinders 14 and 16 is changed so that it becomes necessary to discharge some of the oil from the secondary system in order to have both cylinders operated through the new stroke range, the valve 186 takes care of this by permitting oil to be discharged to the tank from either port 88 or 90, through conduits 188 and 192.

The cams are shown in their adjusted position for maximum stroke. If it is desired to shorten the stroke the cams 330—345 and 332—346 are moved downwardly to the desired position. On the first cycle thereafter the links 328 and 344 will shift as cylinder 14, for example, reaches the bottom of its new shorter stroke. This stroke is not sufficient to move cylinder 16 to the top from its previous position at the bottom of its old and longer stroke so the makeup valve 308 supplied oil to bring cylinder 16 up the rest of the way, just as is the case when leakage occurs in the secondary system. If now it is desired to lengthen the stroke the cams are moved upwardly on their cylinders and in this case on the first cycle, the upwardly moving cylinder will reach the top and become stalled before the downwardly moving cylinder reaches the bottom of its new stroke. As soon as the upwardly moving cylinder stalls, the excess oil is discharged through the valve 186 by the continued downward movement of the other cylinder. The secondary system is thus automatically maintained at the correct volume, not only to compensate for leakage but to correct for changes in stroke setting of the tripping cams. This is furthermore accomplished without putting more oil into secondary system than is ever required, only to have to discharge it at a later point in the cycle, but is also accomplished without manual attention whatever.

It will be noted that when emergency conditions arise it is possible to stop the main rams practically instantly by moving the handle 356 to stop position. Whenever this is done there is no overtravel of the cylinders 14 and 16, because stoppage is effected not merely by bypassing the pump at the valve 46, but also by positively blocking the exit of oil from the rod end of the downwardly moving cylinder. This is done by the piston 216.

The valve 40 normally operates as a flow controlling valve to by-pass through conduit 156 sufficient oil to maintain a constant pressure drop through the restrictor 42. Since the piston 165 is subject to pressure in conduit 38, on its lower side and to pressure in port 44 on its upper side, it will be seen that, should the pressure rise in port 44 (and thus tend to decrease the rate of flow through restrictor 42) the piston 165 will move down to cause less of the pump delivery volume to be by-passed, thus deliver more volume to the restrictor and correspondingly raising the pressure in conduit 38. Thus the pressure in conduit 38 is maintained at a constant increment above the pressure in port 44 regardless of variations in that pressure. The valve 40 also acts as a pressure limiting valve, since, if the pressure in conduit 160 rises above the setting of valve 162, that valve opens permitting oil to escape from the upper side of piston 165. Since passage 164 has greater resistance than passage 160 and since the pressure in conduit 38 is constantly pushing upwardly on piston 165, tending to force oil out of the chamber above the piston, it will be seen that whenever valve 162 opens, valve 40 will open also.

While the pilot valves which are operated by the movement of the various motors are shown as of the rotary type, and as located in several groups, it will be understood that they may be of any other type and may be located in one single group if desired, with suitable operating connections to the cams and trips carried by the fluid motors. The latter construction is preferable since a large part of the conduits forming the various pilot circuits may then be formed as drilled holes in the body of the multiple pilot valve, thus eliminating much of the external piping. The former construction has been selected for illustration as clearer and easier to follow.

While the form of embodiment of the invention as herein disclosed, constitutes a preferred form, it is to be understood that other forms might be adopted, all coming within the scope of the claims which follow.

What is claimed is as follows:

1. A unitary control panel for a hydraulic power transmission system having an oppositely movable main motor and an oppositely movable auxiliary motor comprising a pilot operable four-way valve for controlling the main motor, a four-way valve for controlling the auxiliary motor, flow controlling means for the main motor in series with the first valve, a relief valve for limiting the maximum pressure of fluid supplied to the auxiliary motor and for at times by-passing such fluid at negligible pressure and a back pressure valve for maintaining pressure on the fluid returning from the main motor.

2. A unitary control panel for a hydraulic power transmission system having an oppositely movable main motor and an oppositely movable auxiliary motor comprising a pilot operable four-way valve for controlling the main motor, a four-way valve for controlling the auxiliary motor, flow controlling means for the main motor in series with the first valve, a relief valve for limiting the maximum pressure of fluid supplied to the auxiliary motor and for at times by-passing such fluid at negligible pressure and a back pressure valve for maintaining pressure on the fluid returning from the main motor, said back pressure valve having operating means for opening the same when the relief valve is opened to by-pass fluid supplied to the auxiliary motor.

3. A unitary control panel for a hydraulic power transmission system having an oppositely movable main motor and an oppositely movable auxiliary motor comprising a four-way valve for controlling the main motor, a four-way valve for controlling the auxiliary motor, one of said valves having pilot operating means, flow controlling means for the main motor in series with the first valve, a relief valve for limiting the maximum pressure of fluid supplied to the pilot operating means and for at times by-passing such fluid at negligible pressure and a back pressure valve for maintaining pressure on the fluid returning from the main motor.

4. A unitary control panel for a hydraulic power transmission system having an oppositely movable main motor and an oppositely movable auxiliary motor comprising a four-way valve for controlling the main motor, a four-way valve for controlling the auxiliary motor, one of said valves having pilot operating means, flow controlling means for the main motor in series with the first valve, a relief valve for limiting the maximum pressure of fluid supplied to the pilot operating means and for at times by-passing such fluid at negligible pressure and a back pressure valve for maintaining pressure on the fluid returning from the main motor, said back pressure valve having operating means for opening the same when the relief valve is opened to by-pass fluid supplied to the pilot operating means.

RAYMOND S. MILLER.